US006543717B1

United States Patent
Le Fur et al.

(10) Patent No.: US 6,543,717 B1
(45) Date of Patent: Apr. 8, 2003

(54) COMPACT OPTIMAL AND MODULATABLE THRUST DEVICE FOR CONTROLLING AEROSPACE VEHICLES

(75) Inventors: Thierry Le Fur, Merignac (FR); Bernard Debons, Lege (FR); André LaFond, Merignac (FR); André Dumortier, Merignac (DE)

(73) Assignee: Societe Nationale d'Etude et de Construction de Moteurs d'Aviation S.N.E.C.M.A., Paris (FR)

( * ) Notice: Subject to any disclaimer, the term of this patent is extended or adjusted under 35 U.S.C. 154(b) by 0 days.

(21) Appl. No.: 09/720,210

(22) PCT Filed: Jun. 25, 1999

(86) PCT No.: PCT/FR99/01530

§ 371 (c)(1),
(2), (4) Date: Dec. 22, 2000

(87) PCT Pub. No.: WO00/00731

PCT Pub. Date: Jan. 6, 2000

(30) Foreign Application Priority Data

Jun. 29, 1998  (FR) ............................................ 98 08211

(51) Int. Cl.⁷ ................................................ F42B 10/66
(52) U.S. Cl. ........................ 244/3.22; 249/169; 60/242
(58) Field of Search .............................. 244/3.22, 169, 244/172; 60/242; 239/365.15, 265.19

(56) References Cited

U.S. PATENT DOCUMENTS 3,058,304 A * 10/1962 Corbett
3,069,846 A * 12/1962 Buescher
3,094,072 A    6/1963 Parilla
3,929,289 A   12/1975 Kardon et al.
3,989,191 A   11/1976 McCullough
4,826,104 A *  5/1989 Bennett et al.
5,016,835 A *  5/1991 Kranz
5,158,246 A * 10/1992 Anderson
6,170,257 B1 *  1/2001 Harada et al.

FOREIGN PATENT DOCUMENTS

DE      2 320 076     11/1974
FR      1.460.610      2/1967

* cited by examiner

Primary Examiner—Tien Dinh
(74) Attorney, Agent, or Firm—Weingarten, Schurgin, Gagnebin & Lebovici LLP

(57) ABSTRACT

The thrust device comprises a valve body (20) having a chamber (24) surrounding part of the needle, at least one gas admission opening (27) opening out into the chamber, and a gas outlet opening (25) opening out into the chamber and defined by a wall portion which co-operates with a nose portion (14) of a moving needle (10) to define an outlet section for gas leaving the chamber. Actuator means (40, 41, 43) control the position of the needle in the valve body by acting on a rear end portion of the needle. The nose (14) of the moving needle (10) has an aerodynamic concave profile (15) and the wall portion (29) which defines the outlet (25) from the chamber is shaped in such a manner as to be capable of directing the exiting gases essentially against the concave side of the nose of the needle, which needle acts as the main member for taking up thrust.

12 Claims, 3 Drawing Sheets

COMPACT OPTIMAL AND MODULATABLE THRUST DEVICE FOR CONTROLLING AEROSPACE VEHICLES

FIELD OF THE INVENTION

The invention relates to a device capable of delivering modulatable side thrust in controlled manner for controlling aerospace vehicles such as missiles, launchers, or satellites, using the principle of propulsion by reaction or by ejection of gas.

BACKGROUND OF THE INVENTION

The principle whereby an aerospace vehicle is controlled by devices that deliver modulatable lateral thrust, i.e. perpendicularly to the axis of the vehicle, in order to make it follow a controlled trajectory (force control) or in order to correct its attitude (moment control) is already well known. As a general rule, each modulatable thrust device comprises a valve fed by a gas generator and controlled by an actuator itself controlled by an on-board computer by means of electrical signals.

With valves that are axially symmetrical, it is conventional to use a moving needle whose position in the gas flow as controlled by a proportional actuator determines the through section for the gas leaving via a nozzle having a fixed diverging portion, and thus determines the level of thrust, on the basis of propulsion by reaction.

In conventional moving needle propulsion systems, a large fraction of the thrust is taken up by the wall of the diverging portion (surface integral of static pressure). The length of the fixed diverging portion therefore needs to be long in order to maximize thrust. However it is limited in practice by the need to take account of phenomena associated with matching external pressure, such that the length of the fixed diverging portion is the result of a compromise between those contradictory requirements. Conventional devices having a moving needle and a fixed diverging portion also present two drawbacks: relatively large size along the thrust axis and permanent failure to optimize the thrust produced, with those drawbacks being particularly severe in applications to vehicles of relatively small diameter whose altitude changes very considerably in flight, such as air-to-ground interceptor missiles.

OBJECT AND BRIEF SUMMARY OF THE INVENTION

An object of the invention is to propose modulatable lateral thrust devices for controlling aerospace vehicles, which devices are compact, in particular in the thrust direction, and consequently better suited to being integrated in vehicles, and are of smaller mass. In particular, an object of the invention is to propose modulatable lateral thrust devices capable of being integrated in vehicles while complying with the dimensional constraints thereof, such as limited outside diameter.

Another object of the invention is to propose thrust devices that are not only compact, but that are also capable of delivering optimal thrust whatever the external pressure, i.e. whatever the altitude.

To this end, the present invention provides a device comprising: a moving needle; a valve body having a chamber surrounding part of the needle, at least one gas admission opening out into the chamber, and a gas outlet opening out into the chamber and defined by a wall portion that co-operates with a portion of the nose of the needle to define an outlet section for gas leaving the chamber; and actuator means for controlling the position of the needle in the valve body by acting on a rear end portion of the needle; in which device the nose of the moving needle has an aerodynamic concave profile and the wall portion which defines the outlet from the chamber is shaped in such a manner as to be capable of directing the escaping gas essentially against the concave shape of the nose of the needle.

Thus, the needle performs simultaneously the function of a moving member that enables thrust to be modulated by adjusting the gas outlet section, and the function of the main member for taking up the thrust that is produced.

As a result, and contrary to conventional modulatable thrust devices, there is no need to extend the gas outlet from the chamber by a diverging portion, or to do so in a very short manner only. The lateral extent of the thrust device is consequently reduced, thereby making it possible to design vehicle having limited outside diameter. The means for actuating the needle act on the rear of the needle, so they are disposed on the inside and consequently do not encumber the periphery of the vehicle. In addition, the outgoing gas jet is confined at its periphery by the effect of the surrounding atmospheric pressure and it adapts automatically to variations in ambient pressure, thus always producing thrust that is optimal as a function of altitude.

An architecture for a self-adaptive thrust device with a central body in the form of an optionally truncated point having a concave aerodynamic profile and with a nozzle that is virtual at least in part is known per se, in particular as a "expansion-deflection nozzle" or as an "aerospike", but in the field of propelling aerospace vehicle. In that field of propelling aerospace vehicles, it is suggested by patent U.S. Pat. No. 3,888,419 and U.S. Pat. No. 3,989,191 to provide a limited amount of variation in the intensity and the direction of the thrust by modifying the position of a front portion of a central metal body by means of hydraulic actuators housed inside it. The reliability of such a device exposed to hot gases would seem to be difficult to guarantee. Mention can also be made of patent U.S. Pat. No. 3,929,289 which describes an axial thrust device with a central body having an outer portion made of graphite. Thrust can be modulated by varying the axial position of a tube surrounding the central body, which requires external actuator means.

According to a feature that is advantageous in terms of compactness and ability of the thrust device of the invention to be integrated, the valve body is immersed in a propulsion gas generator. The valve body and the needle, which come into contact with the hot gases, are preferably made of thermostructural composite material, in particular a composite material having a ceramic matrix such as a C/SiC composite material (carbon fiber reinforcement densified by a matrix of silicon carbide).

According to another feature of the thrust device of the invention, the actuator means are of the proportional type, enabling the thrust to be modulated over the entire range of full to none. The actuator means are of the electromechanical type, for example, and they can be connected to the needle by a rotary shaft fitted with an eccentric engaged in a peripheral groove in the rear end portion of the needle.

According to yet another feature of the thrust device of the invention, the actuator means are thermally insulated from the hot gases flowing in the body of the valve.

DESCRIPTION OF PREFERRED EMBODIMENTS

Figure 1:
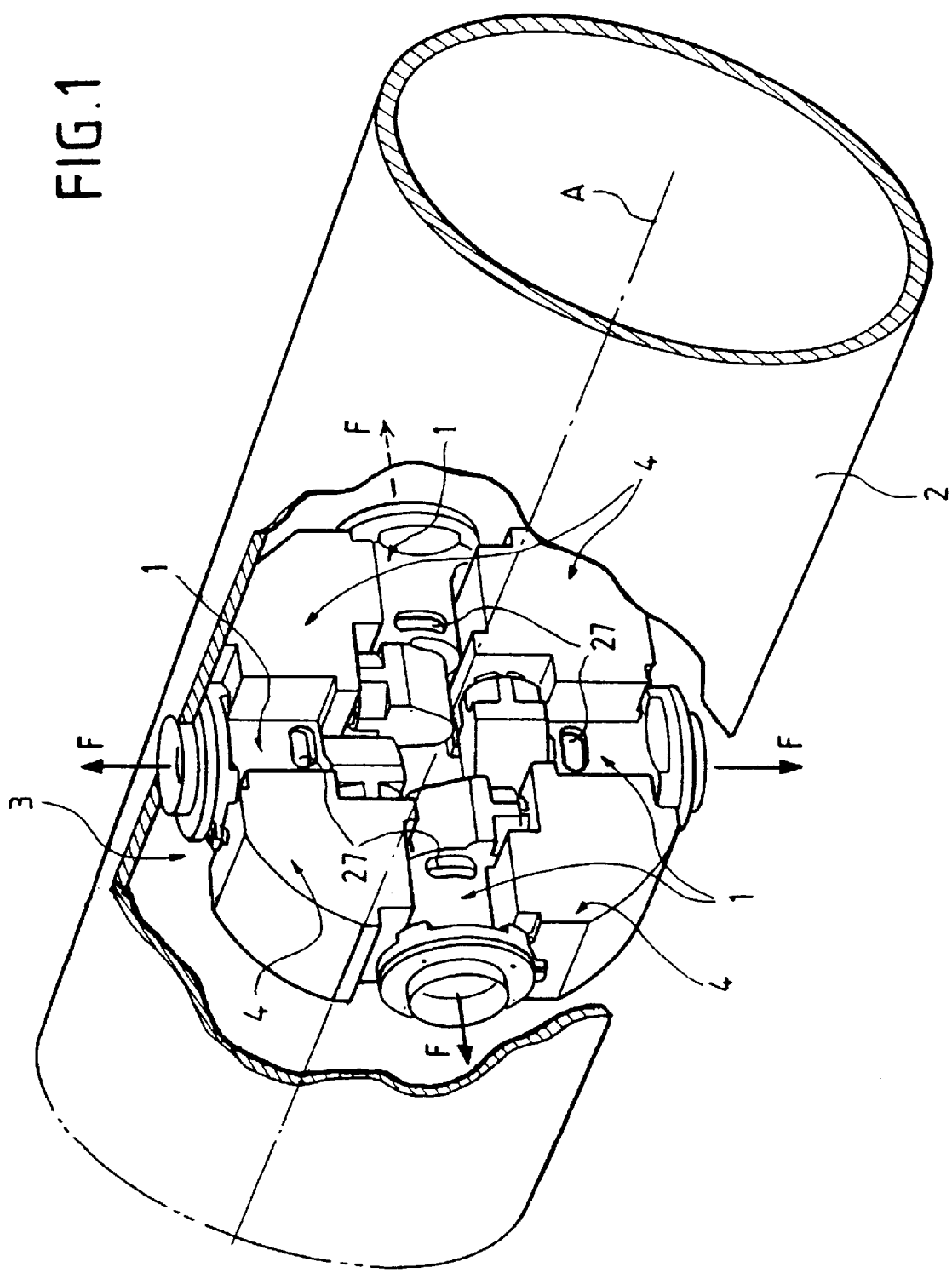
FIG. 1 of the accompanying drawings shows one way in which coplanar independent proportional valves received in a gas generator can be mounted to provide force control for an interceptor missile of limited calibre.

FIG. 1 shows a plurality of modulatable thrust devices 1 of the invention integrated in an aerospace vehicle such as an interceptor missile 2 of limited calibre. The term "limited calibre" is used herein to mean that the body of the missile is of relatively small diameter.

The thrust devices 1 deliver respective modulatable amounts of thrust in directions that are substantially normal to the main axis A of the vehicle 2 (arrows F). They are controlled by actuators housed in leakproof cases 4 and they are under the control of the on-board computer of the vehicle.

In the example shown, there are four modulatable thrust devices regularly distributed about the axis A of the vehicle 2 and they lie in a common plane, i.e. they deliver lateral thrust in directions all situated in the same plane which is orthogonal to the axis A. When force control is used, the lateral thrust is applied substantially level with the center of gravity of the vehicle.

The thrust devices 1 are immersed inside a gas generator 3 which serves to produce the propulsive gas feeding the thrust devices. In FIG. 1, the members of the vehicle 2 other than the set of modulatable thrust devices 1 are not shown.

Figure 2:
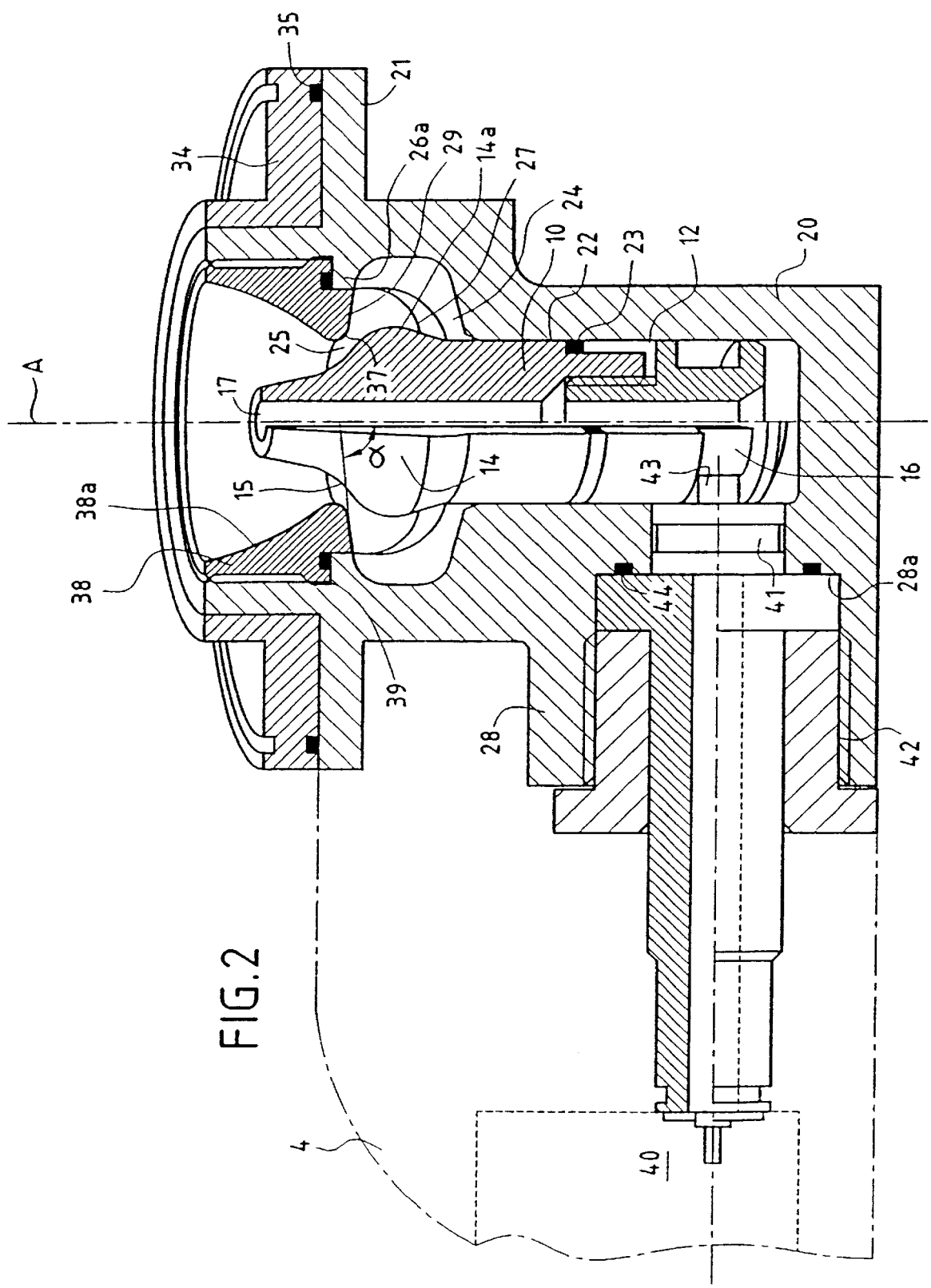
FIG. 2 shows a particular embodiment of a modulatable thrust device of the invention, seen partially cut away.

One of the modulatable thrust devices shown in FIG. 1 is described below with reference to FIGS. 2 and 3 (top portion).

The modulatable thrust device 1 comprises an axially symmetrical needle 10 that is movable inside a valve body 20. The valve body is immersed in a hot gas generator 30 and is fixed, e.g. by means of screws, to the outer skin 32 of the aerospace vehicle to be controlled, e.g. a missile. For this purpose, the valve body 20 is provided with a circular flange 21 which bears against the inside wall of a thickened portion 33 of the skin 32 with a cylindrical insulating ring 34 of L-shaped meridian section being interposed therebetween. O-rings 35 and 36 are interposed between the insulating ring 34 and the flange 21, and between the insulating ring 34 and the inside wall of the skin 32.

The needle 10 is movable in a direction A that is transverse relative to the longitudinal direction of the vehicle to be controlled. It comprises a cylindrical rod 12 that is slidably received in a cylindrical housing 22 of the valve body with an annular sealing segment 23 being interposed between them, being received in a peripheral groove of the rod 12. At its front end portion or "nose" 14, the needle 10 has a swollen portion 14a which is situated in a chamber 24 of the valve body of a diameter that is larger than that of the housing 22. Between the swollen portion 14a and its front end, the needle 10 has a portion 15 of tapering diameter forming an aerodynamic concave profile.

The chamber 26 has a gas outlet opening 25 defined by a throat 37 of an axially symmetrical insert 38 which is screwed into a cylindrical housing formed by a front portion 26 of the valve body. The throat 37 acts as a seat for the nose 14 of the needle. The insert 38 bears against an internal rim 26a of the valve body with a gasket 39 being interposed. One or more propulsion gas admission ports 27 are formed through the peripheral wall of the chamber 26 (see also FIG. 1). At its rear end opposite from its nose 14, the needle 10 has a peripheral groove 16. An axial bore 17 passes through the needle 10 along its entire length.

The position of the needle in the valve body is controlled by means of an electromechanical actuator 40. The actuator is connected to the needle 10 by a shaft 41 supported by a bushing 42 and terminated by an eccentric 43 engaged in the groove 16. The bushing 42 is screwed into a cylindrical housing 28 of the valve body until it comes into abutment against a rim 28a formed in the valve body. An annular gasket 44 is interposed between the bushing 42 and the rim 28a. The housing 28 has an axis that is orthogonal to the axis of the housing 22.

The above-described thrust device operates as follows. The hot gases produced by the gas generator and admitted into the chamber 24 via the ports 27 are ejected through the outlet 25 being directed against the concave surface 15 of the nose 14 of the needle. To this end, the portion of the inside wall 29 surrounding the opening 25 is at an angle α relative to the axis A, which angle is greater than 45°, preferably greater than 60°, and capable of reaching 90°, in order to direct the gases against the surface 45 slightly towards the front, or even normally relative to the axis A. This portion of the inside wall 29 is formed in the example shown by inside wall portions of the valve body 20 and of the piece 38 which run on one from the other. The thrust exerted in this way is taken up mainly by the needle 10 in the direction A, i.e. laterally relative to the vehicle.

At the outside of the gas outlet 25, the piece 38 can be made so as to form a very short nozzle with the beginning of a diverging portion 38a that runs on from the throat 37. However this is not essential in the absence of any external aerodynamic flow along the axis of the vehicle, with the envelope of the exiting gas jet taking up a shape which adapts automatically to the outside pressure by "pressing" against the surrounding atmosphere. The device could thus optionally have no nozzle diverging portion at all.

For a missile or a launcher operating in the atmosphere, it is nevertheless advantageous to maintain some minimum length of diverging portion to act as an aerodynamic cowling and to limit interaction between the ejected gas jet level with the needle and the external flow along the body of the vehicle.

Figure 3:
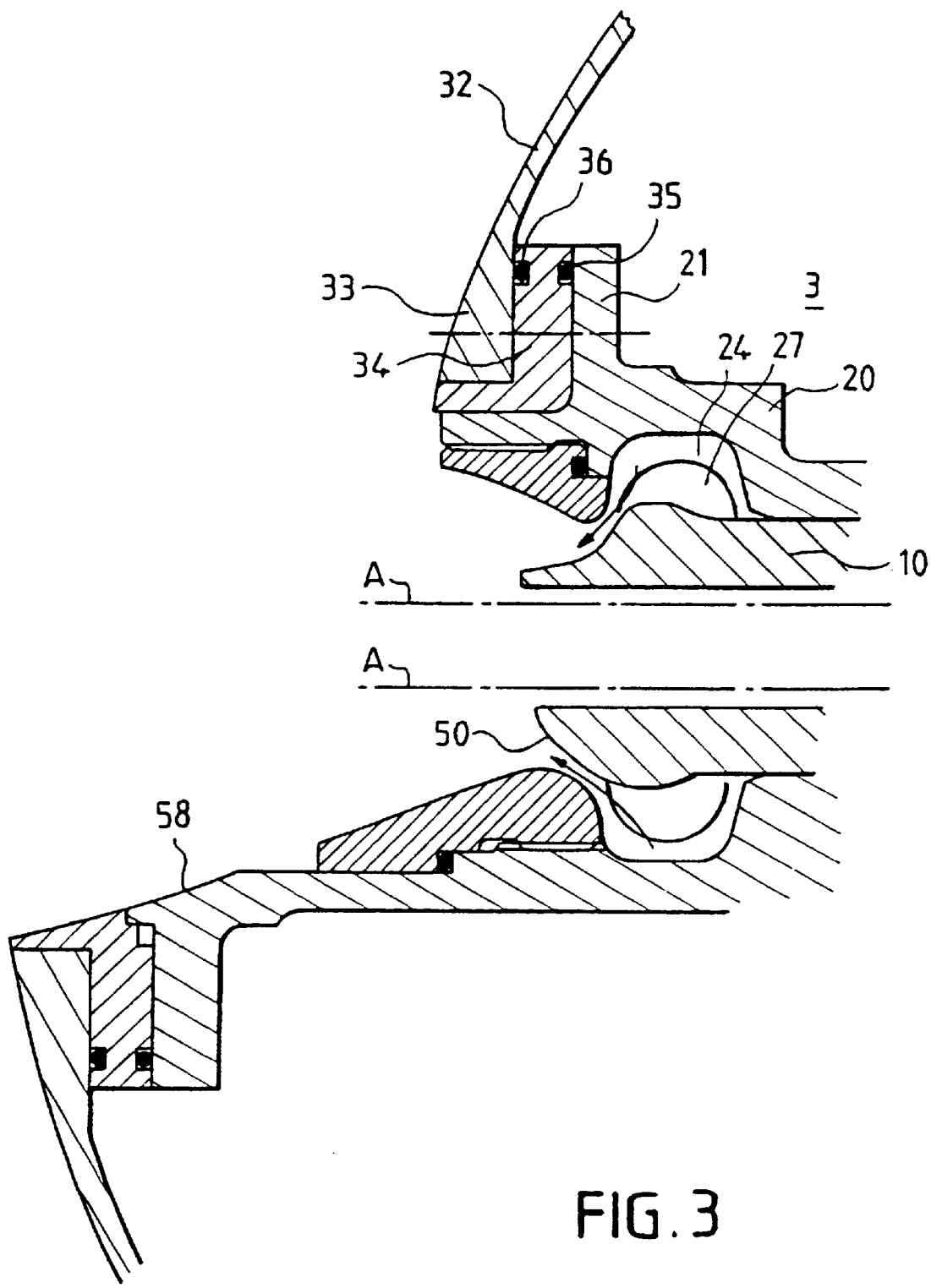
FIG. 3 is a section view whose top portion shows how the FIG. 2 device can be integrated in a vehicle and whose bottom portion, by way of comparison, shows how a prior art modulatable thrust device can be integrated.

The bottom portion of FIG. 3 shows the shape that would be needed for a nozzle 58 in order to obtain equivalent performance using a prior art "aerospike"-type needle 50 that does not have an optimized aerodynamic nose. A comparison between the bottom and top portions of FIG. 3 shows the considerable saving in space that is provided by the invention while keeping the nose of the needle masked from external flows along the skin 32 of the vehicle. Furthermore, in the prior art, the fixed nozzle is of a predetermined shape which is not adapted to flight conditions of the vehicle at all altitudes.

Using the actuator 40 to rotate the shaft 41 enables the eccentric to be moved in the groove 16, thereby causing the needle 10 to slide in the housing 22 and thus vary the gas outlet section, with the consequence of varying the intensity of the thrust taken up by the needle. It is preferable to use a proportional actuator so as to enable the thrust to be adjusted to any desired value. The bore 17 enables the pressures acting on the ends of the needle to be balanced, thereby making the needle easier to move. The various similar modulatable thrust devices distributed around the periphery of the vehicle to be controlled make it possible by suitably combining the thrusts they exert, to produce the lateral thrust component that is required, where appropriate, for correcting the attitude of the vehicle, or for deflecting its trajectory (force control).

The needle 10 and the valve body 20 are directly exposed to the hot gases, and indeed the hot gases are even directed against the nose of the needle. It is therefore necessary to make them out of materials that are capable of withstanding high temperatures. It is preferable to use a thermostructural composite material. Thermostructural composite materials are remarkable for their lightness, for their good mechanical properties, and for their ability to conserve those properties at high temperatures. They are constituted by fiber reinforcement made up of refractory fibers (in particular carbon fibers or ceramic fibers) densified by a refractory matrix likewise of carbon or ceramic. Given the temperature level and the physico-chemical attack (erosion) encountered, it is preferable to use a ceramic matrix composite (CMC) material such as a C/SiC composite material having carbon fiber reinforcement and a silicon carbide matrix. The use of thermostructural composite material makes it possible in particular to do without complex cooling systems of the kind used in most central body nozzles presently known. The shaft 41 of the actuator device can be made of the same material. Because the actuator 40 is kept away from the hot gases, it is not subjected to the same high temperatures. It is thermally insulated by interposing layers of insulating material along the path of the shaft 41 and by being housed in a leakproof case 4. The various gaskets in the portions exposed to the highest temperatures can be made of materials based on graphite.

What is claimed is:

1. A modulatable thrust device for controlling an aerospace vehicle by generating lateral thrust directed substantially perpendicularly to the main axis of the vehicle, the thrust device comprising:

a valve body having a chamber;

a moving needle extending partly in said chamber;

at least one gas admission opening out into the chamber;

a gas outlet opening out into the chamber and defined by a wall portion that co-operates with a portion of a nose of the needle to define an outlet section for gas leaving the chamber, said needle nose having an aerodynamic concave profile and said wall portion being shaped in such a manner as to be capable of directing the gas leaving the chamber essentially against the concave shape of the needle and thereby producing lateral thrust taken up by the needle; and actuator means for controlling the position of the needle in the valve body by acting on a rear end portion of the needle.

2. A device according to claim 1, wherein the gas outlet is formed by a throat which, on the outside of the gas outlet, runs into a beginning of a diverging portion forming a very short nozzle surrounding the nose of the needle.

3. A device according to claim 1, wherein no nozzle diverging portion is provided on the outside of the gas outlet.

4. A device according to claim 1, wherein the valve body is immersed in a propulsion gas generator.

5. A device according to claim 4, wherein the actuator means are immersed in the propulsion gas generator and are thermally insulated from the gases produced by the generator.

6. A device according to claim 1, wherein the valve body and the needle are made of thermostructural composite material.

7. A device according to claim 5, wherein the valve body and the needle are made of ceramic matrix composite material.

8. A device according to claim 1, wherein the needle is provided with an axial bore over its entire length.

9. A device according to claim 1, wherein the actuator means are of a proportional type.

10. A device according to claim 1, wherein the actuator means comprise an electromechanical actuator connected to the needle via a mechanical link.

11. A device according to claim 10, wherein the actuator means comprise a shaft provided with an eccentric engaged in a groove formed in the rear end portion of the needle.

12. A device according to claim 3, wherein:

the valve body is immersed in a propulsion gas generator;

the actuator means are immersed in the propulsion gas generator and are thermally insulated from the gases produced by the generator;

the valve body and the needle are made of thermostructural composite material;

the valve body and the needle are made of ceramic matrix composite material;

the needle is provided with an axial bore over its entire length;

the actuator means are of a proportional type;

the actuator means comprise an electromechanical actuator connected to the needle via a mechanical link; and the actuator means comprise a shaft provided with an eccentric engaged in a groove formed in the rear end portion of the needle.

* * * * *

UNITED STATES PATENT AND TRADEMARK OFFICE
CERTIFICATE OF CORRECTION

PATENT NO. : 6,543,717 B1
DATED : April 8, 2003
INVENTOR(S) : Thierry Le Fur et al.

It is certified that error appears in the above-identified patent and that said Letters Patent is hereby corrected as shown below:

<u>Title page,</u>
Item [75], Inventors, "(DE)" should read -- (FR) --.

Signed and Sealed this

Eleventh Day of May, 2004

JON W. DUDAS
*Acting Director of the United States Patent and Trademark Office*